United States Patent
Whalin

(10) Patent No.: US 6,491,560 B1
(45) Date of Patent: Dec. 10, 2002

(54) ARRAY TILE SYSTEM AND METHOD OF MAKING SAME

(75) Inventor: Jeffery A. Whalin, Fountain Hills, AZ (US)

(73) Assignee: Motorola, Inc., Schaumburg, IL (US)

( * ) Notice: Subject to any disclaimer, the term of this patent is extended or adjusted under 35 U.S.C. 154(b) by 0 days.

(21) Appl. No.: 09/578,313

(22) Filed: May 25, 2000

(51) Int. Cl.[7] ................................................. H01J 9/18
(52) U.S. Cl. ............................. 445/24; 438/666; 29/843
(58) Field of Search ........................... 439/65; 257/772, 257/779; 29/843; 445/24; 438/666

(56) References Cited

U.S. PATENT DOCUMENTS

| | | | |
|---|---|---|---|
| 4,288,808 A | * | 9/1981 | Hantusch .................... 257/777 |
| 5,196,652 A | * | 3/1993 | Mikkelsen et al. ........... 29/843 |
| 5,563,470 A | | 10/1996 | Li |
| 5,661,531 A | | 8/1997 | Greene et al. |
| 5,668,569 A | | 9/1997 | Greene et al. |
| 5,693,170 A | | 12/1997 | Li |
| 5,796,452 A | | 8/1998 | Pierson |
| 5,805,117 A | | 9/1998 | Mazurek et al. |
| 5,808,710 A | | 9/1998 | Pierson |
| 5,867,236 A | | 2/1999 | Babuka et al. |
| 5,889,568 A | | 3/1999 | Seraphim et al. |
| 5,903,328 A | | 5/1999 | Greene et al. |
| 5,963,281 A | | 10/1999 | Koons et al. |
| 5,998,922 A | | 12/1999 | Ozawa et al. |
| 6,005,649 A | | 12/1999 | Krusius et al. |

FOREIGN PATENT DOCUMENTS

| | | |
|---|---|---|
| WO | WO9531876 | 11/1995 |
| WO | WO9607196 | 3/1996 |
| WO | WO9736281 | 10/1998 |
| WO | WO9843131 | 10/1998 |
| WO | WO9848319 | 10/1998 |
| WO | WO9941732 | 8/1999 |

* cited by examiner

Primary Examiner—Kenneth J. Ramsey
(74) Attorney, Agent, or Firm—William E. Koch; Kevin D. Wills

(57) ABSTRACT

A tile (10) having a plurality of grooves (22). An array of tiles (10) is assembled by placing at least two tiles (10) in generally opposing relationship to one another, with the grooves (22) substantially juxtaposed to define wells (38). When intended for incorporation into a device (40), such as a display device, a conductive interconnect (36) is formed in the wells (38). Devices include a base substrate (40), a first plate (46) and a second plate (48). A first member (50) may be employed to separate the base substrate (40) from the first plate (46). A second member (52) may be employed to separate the first plate (46) from the second plate (48).

36 Claims, 3 Drawing Sheets

ARRAY TILE SYSTEM AND METHOD OF MAKING SAME

BACKGROUND OF THE INVENTION

This invention relates generally to tiles for an array, and more specifically to a display system incorporating a tiled array.

The manufacture of tiles for arrays, such as those for display devices, generally involves intensive manufacturing and processing methods in order to optimize yield. Notwithstanding the strict controls over processing employed, slight imperfections that may result from the employment of existing methods places entire production runs or batches at risk for scrap. Therefore, a need exists to provide an improved method for manufacturing of tiles and their assembly into a tiled array, particularly for incorporation into an output device, such as a display device.

Tiles for arrays used in displays desirably are individually addressable and readily permit for the formation of arrays where the appearance of the interface between tiles in an array, to the user of a display is relatively seamless. To successfully achieve this, typical arrays tend to be confined to 2×2 tile units. A need exists to build improved arrays of 2×2 tile units as well as arrays with more tiles, preferably where electrical connections can be made on two, three, four or more sides of the tile.

DETAILED DESCRIPTION OF THE DRAWINGS

In one preferred aspect of the present invention, a tile for incorporation into an array is prepared. In another preferred aspect of the present invention, an array is prepared to incorporate such tile. In yet another preferred aspect of the present invention, a display device is prepared, which incorporates an array of tiles.

Figure 1:
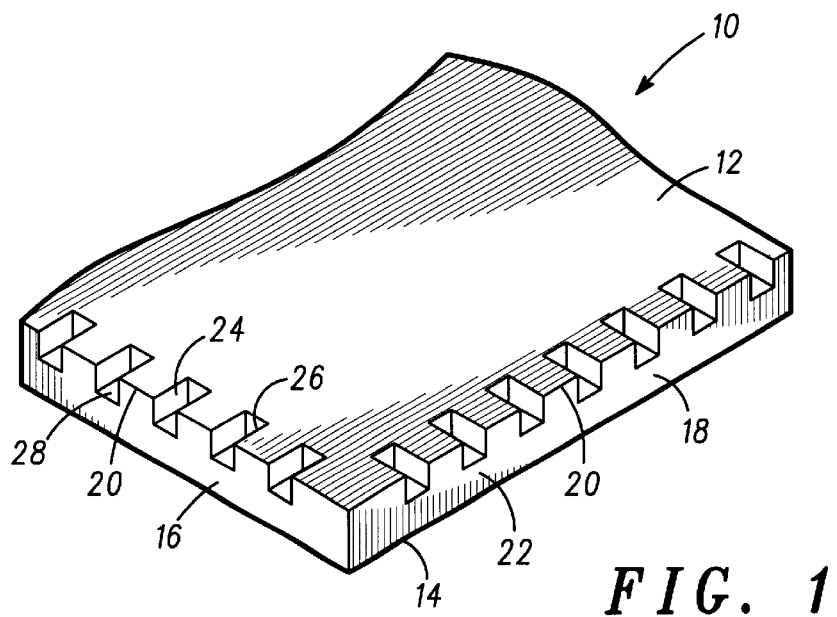
FIG. 1 is a perspective view of a portion of tile in accordance with the present invention.

Referring first to FIG. 1, there is shown a tile 10 in accordance with the present invention. The tile includes a first surface 12, a second surface 14 generally opposing the first surface, and a plurality of sides defining the periphery of the tile. In the embodiment shown in FIG. 1, the tile has four sides, with a first pair of opposing sides 16 (one side shown) and a second pair of opposing sides 18 (one side shown). However, the number of sides may vary as desired, as may the shape. For instance, in the embodiment of FIG. 1, albeit not drawn to scale, there is shown a portion of a tile having edges arranged to define a rectangular surface shape. Other surface shapes may be employed as desired. In one preferred embodiment, for which the tile surfaces are rectangular as shown in FIG. 1, the tiles of the present invention preferably are dimensioned according to a formula wherein the ratio of the length of the first sides 16 to the second sides 18 is about $(4:3)^x$, where x is at least about 1, and more preferably is 1 or 2 (e.g., with a corresponding ratio, respectively, of about 4:3 or 16:9). In another embodiment, the tile surface shapes are substantially square (e.g., both pairs of opposing sides have substantially the same length). The skilled artisan may vary the dimensions in any suitable manner to achieve a desired result.

Formed at an edge 20 where the first surface 12 meets a side (e.g., side 16 or side 18), are a plurality of grooves 22. FIG. 1 illustrates an embodiment where the plurality of grooves 22 are spaced at a suitable distance from one another along at least a portion of the length of the edge 20. Demonstrated more clearly in conjunction with FIG. 3a, the grooves are defined by at least a first wall 24 (and preferably a generally opposing second wall 26) lying in a plane that intersects with the plane in which the first surface lies, and a wall 28 (recessed into the body of the tile relative to the edge 20) that adjoins at least the first wall 24 (and preferably the second wall 26). The grooves are dimensioned as desired for receiving an interconnect material, e.g., a metal such as a solder. In a particularly preferred embodiment, the grooves are formed along more than one of the sides of the tile.

Figure 2:
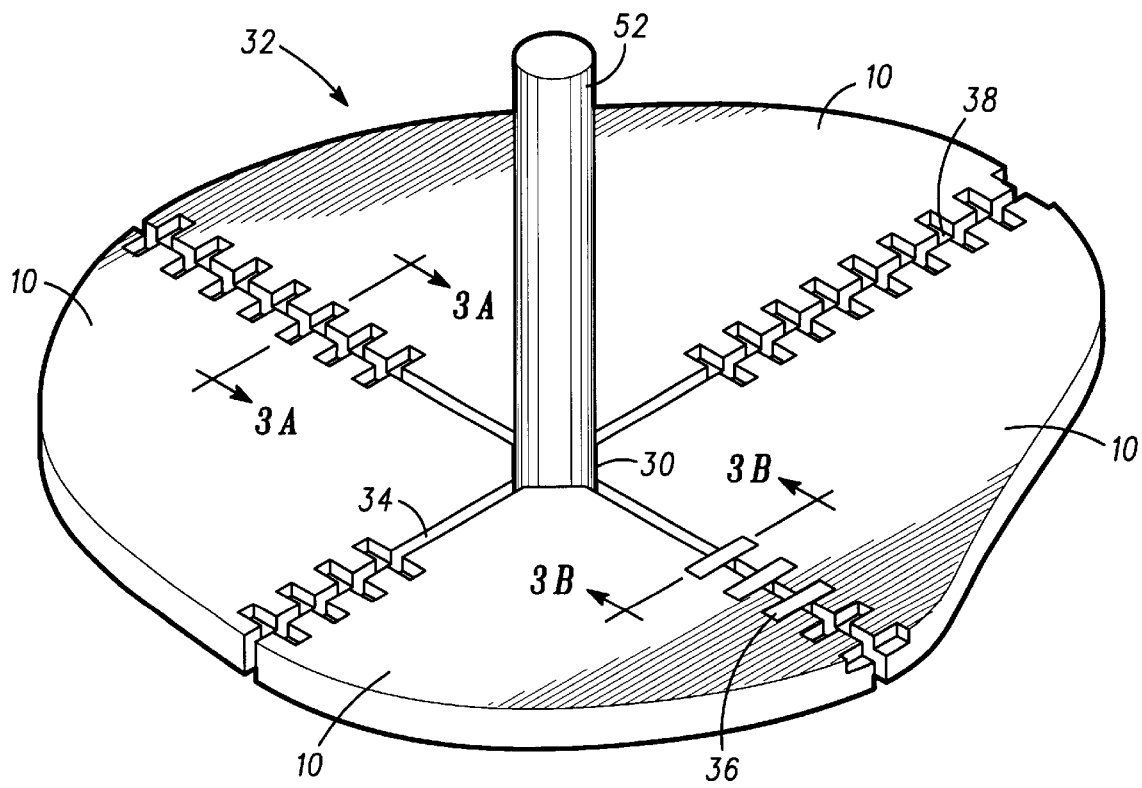
FIG. 2 is a perspective view of an array of tiles in accordance with the present invention.

In yet another embodiment, the tiles 10 are shaped (e.g., along an edge, or more preferably in one or more of their corners) to facilitate placement of upright members such as spacers between adjoining tiles. By way of illustration, FIG. 2 shows a notched corner 30 of a tile in an array 32. As shown in FIG. 2, an array incorporating a plurality of tiles each having notched corners can be placed so that the notched corners are proximate one another to define a through space into which an upright member 52 such as a spacer can be placed. Alternatively, a single tile may be shaped to permit passage of the upright member. Preferably, the tiles will have grooves formed on each side, allowing for signaling communication across the tile. Though shown for illustration purposes as including interconnects 36 in a few grooves, in one embodiment, interconnects 36 are placed in every groove.

The tiles may be made of any suitable material, the selection of which is within the knowledge of the skilled artisan (examples of which are discussed further herein). Each tile may also incorporate one or a plurality of pixels (not shown) or other emitter sites, which is in suitable signaling communication with a signal source. One or a plurality of communications paths (not shown) can be incorporated into the tile as desired, using conventional techniques.

In accordance with one preferred embodiment, the tiles according to the present invention are prepared by providing a starting substrate; forming a plurality of grooves in the starting substrate according to a first predetermined pattern having at least a first axis; and separating the starting substrate into a plurality of tiles substantially along said at least one axis.

In another embodiment, a plurality of grooves is formed in the starting substrate according to a second predetermined pattern having at least a second axis. The first and second patterns may include linear portions, curved portions or both. Preferably, for forming tiles that are generally rectangular, first pattern and the second pattern have linear portions defining the first axis and the second axis, and the second axis is generally orthogonal to the first axis.

The grooves may be formed using any suitable material displacement process, including but not limited to a mechanical process, a chemical process, an electromechanical process, an electrochemical process, an energy concentration process, or a mixture of such techniques. Without intending to be limited thereby, examples of such processes include, for instance, etching such as chemical or laser etching, thermal stamping, milling such as ion beam milling or ultrasonic milling (e.g., boron carbide), abrading, particle blasting, machining, or the like. The depth of the well is sufficient to permit molten interconnect to spread and upon solidification be substantially coplanar with the surface of the tile from which the well depends.

Either before or after formation of the wells, the starting substrate is divided into a plurality of separate tiles by the separating step. Separating (which preferably occurs along the axes) may be accomplished in any suitable manner, such as (without limitation) by scribing, by laser scribing, by zero width laser scribing, by scribing and breaking, by sawing (e.g., diamond saw or wafer saw) or the like.

The ultimate tile size selected may be any suitable size for the desired application. To illustrate one example, keeping in mind that larger or smaller sizes may be made, a starting substrate (and the resulting tile) may be about 1.1 mm thick. The resulting tile may be about 10 square millimeters to about 10 square centimeters; again larger or smaller tiles also being possible.

Referring again to FIG. 2, there is shown an example of an array 32 of tiles 10 in accordance with one embodiment of the present invention. The arrays of the present invention contemplate the employment of at least two, more preferably at least three and still more preferably at least four, and even still more preferably at least five tiles that are arranged adjacent one another with their sides in spaced but opposing relationship relative to one another, effectively defining a channel 34 between respective adjoining tiles. In one embodiment, the array includes at least nine tiles, arranged in a 3×3 manner. FIGS. 2 and 3b illustrate an example of one such adjoining relationship, which further illustrates a conductive interconnect 36 bridging a signal communication path between tiles. Though other less direct interconnect arrangements may be employed, in this example, tiles are arranged so that one or more grooves 24 are aligned substantially opposite one another or substantially juxtaposed to define a well 38 for receiving the interconnect 36. When the interconnect is a metallic material deposited into the well in its molten state, preferably the depth of the well is sufficient to permit molten interconnect to spread and upon solidification will be substantially coplanar with the surface of the tile from which each of the grooves depend.

The interconnect may be any suitable conductive material. Preferably it is a metal, and more preferably is a metal that exhibits the surface free energy or wetting characteristics of conventional solder materials. The channel 34 between adjoining tiles is sufficiently narrow such that the conductive material is capable of wetting itself upon being deposited in the well so as to form a bridge between two tiles, but preferably avoids complete filling of the channel 34 between the tiles. Thus, the preferred material is a solder, which may be a pure metal (e.g., indium) or a eutectic formulation including one or more metals such as indium, gold, germanium, tin, lead or the like. The metal material can be provided in any suitable form, including as a solid, or dispersed in a medium, such as a paste (thereby permitting deposition directly by the paste, or by conventional screen printing techniques).

Figure 3A:
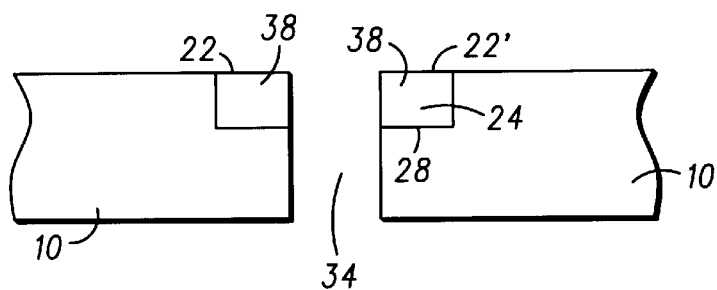
FIG. 3a is a sectional view of a portion of an array through 3a–3b of FIG. 1.
Figure 3B:
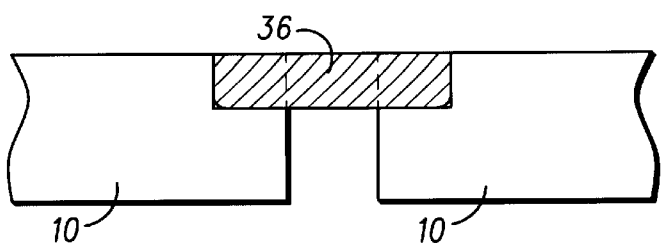
FIG. 3b is a sectional view of a portion of an array through 3a–3b of FIG. 1.

As shown in FIGS. 2, 3a and 3b, to prepare an array of the present invention, a first tile (such as tile 10 of FIG. 1) having a plurality of first grooves 22 along a first edge is provided along with a second tile (such as tile 10 of FIG. 1) having a plurality of second grooves 22' along a second edge. The first tile is placed in spaced opposing relationship adjacent said second tile, and substantially coplanar therewith and so that said first and second grooves are substantially juxtaposed to define the well 38. A conductive interconnect 36 is introduced in the space defined between said first edge and said second edge and said first and second grooves.

As desired, suitable spacers (either temporary or permanent) may be employed to help maintain a desired spacing during assembly. The interconnects are then formed using any suitable material delivery process, such as without limitation, vapor deposition, electroplating, spraying (e.g., with a micronozzle), applying a preformed interconnect, applying a powder that is sintered, or the like.

In one embodiment, the conductive interconnect 36 is deposited by introducing particles having a diameter greater than the spacing between the tiles to keep said particles in said wells, removing excess particles, and melting (i.e. heating the conductive interconnect for reflow) the particles, whereby the molten material will not fill the channel between the tile edges below the grooves, but it will wet to itself sufficiently to form the bridging interconnect.

Preferably the arrays of the present invention include a plurality of spatially separated or otherwise individually addressable active tiles 10. Electrical connections may be made on each side of a tile, allowing them to be used in an array configuration requiring electrical continuity across a tile to and between adjacent tiles. While the preferred tiles for the devices of the present invention are the tiles 10 such as shown in the drawings, any suitable tile configuration may be employed.

Figure 4:
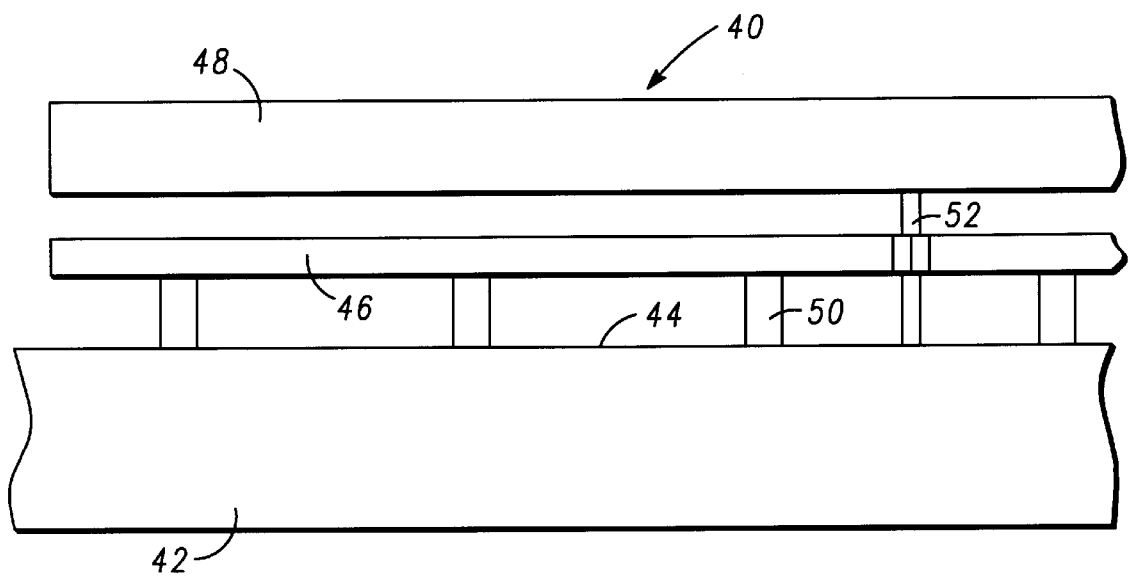
FIG. 4 is, a side section of a device in accordance with the present invention.

In yet another embodiment of the present invention, arrays are assembled into an output device, such as (without limitation), a display device, and particularly a flat panel display device. The devices of the present invention may employ any known information output technology. By way of example, the devices of the present invention may be flat panel displays, field emission displays, LED displays, LCD displays, plasma displays, or the like. As depicted in FIG. 4, in general a preferred display 40 of the present invention includes a base substrate 42 having a first surface 44; a first plate 46 directly opposing the base substrate 42; and a second plate 48 in opposing spaced relationship to said first plate 46. Also shown in FIG. 4 is an example of one type of structure (without limitation) that may optionally be used to maintain the base substrate 42 spaced from the first plate 46, which is desirable in certain applications. For instance, in some displays it may be desirable to enclose the display and evacuate it or otherwise generate a specific desired environment within the device. The skilled artisan is familiar with techniques for accomplishing this, such as evacuation techniques, gettering techniques, or a combination thereof. Spacing between the base substrate 42 and the first plate 46 thereby defines a plenum, into which a suitable getter (e.g., passive getters (NEG's) or evaporable getters such as barium) may be employed to help maintain the desired pressure or atmosphere conditions in a sealed device. The base substrate 42 may also be coupled to a vacuum pump (e.g., ION pump).

In one embodiment of the present invention, a method for making a display device, includes the steps of providing the base substrate 42 with its first surface 44; placing the first plate 46 opposite the first surface; and placing the second plate 48 in opposing spaced relationship to the first plate 46. The first plate 46 includes an array of active tiles, preferably tiles such as those in FIGS. 1 and 2, each having substantially juxtaposed opposing grooves defining the wells 38, and further including a conductive interconnect 36 in the wells.

Figure 5:
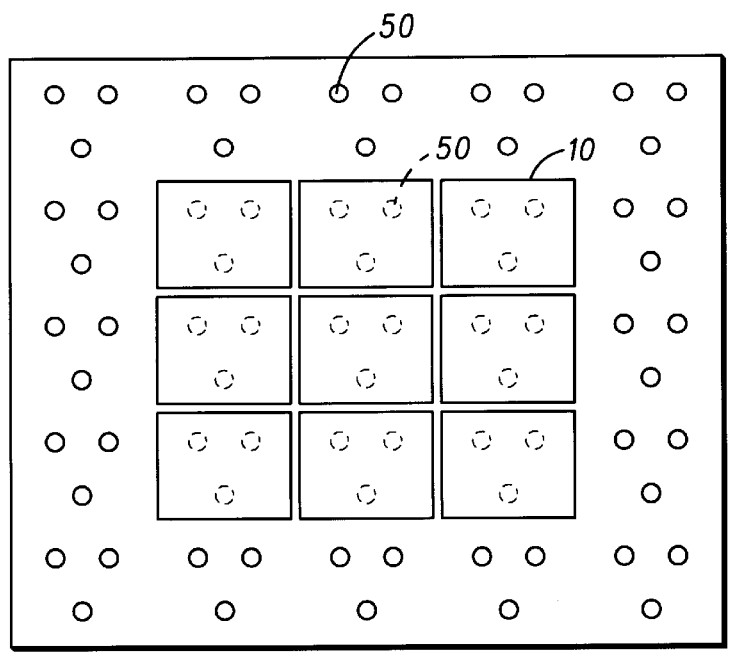
FIG. 5 is an overhead plan view of a portion of a device in accordance with the present invention.

For spacing, it may be desirable to incorporate at least one and more preferably a 20 plurality of first members 50 between the first surface 44 of the substrate 42 and the first plate 46, so that the first plate 46 is substantially parallel to the first surface 44. Any suitable structure and arrangement may be employed for the first members 50. As shown in FIG. 5, for instance, each tile 10 is supported by at least 3 spaced members 50 (i.e., for at least a three point support arrangement of the first plate 46). Of course, fewer or greater than three members may be used. For instance as little as one member may be employed provided that it affords sufficient stability and support for the first plate relative to the base substrate. The members may be separate structural units, or they may be integrated into either the base substrate, the first plate 46 or a combination thereof. Preferably, spacing between the first surface 44 and the first plate 46 is sufficient to avoid virtual leak conditions.

The second plate 48 is maintained in spaced opposing relationship (particularly when evacuated) to the first plate 46 by one or a plurality of second members 52. In the embodiment shown in FIG. 4, the second members are illustrated as rods, though they may be any suitable shape. Further, the second members 52 are depicted as penetrating through the first plate 46 and extending from the first surface 42 of the base substrate 40 through to the second plate 48.

Figure 7:
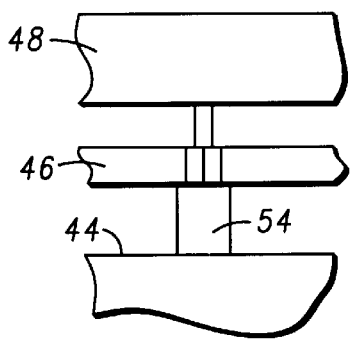
FIG. 7 is a side section of a device in accordance with the present invention employing a support structure such as in FIGS. 6a and 6b.
Figure 6A:
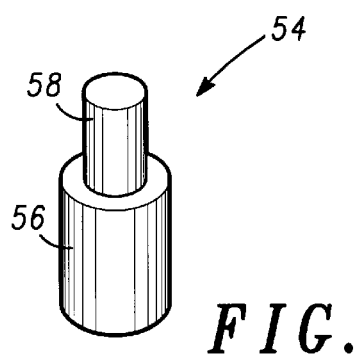
FIGS. 6a and 6b are perspective views of examples of a unitary support structure.
Figure 6B:
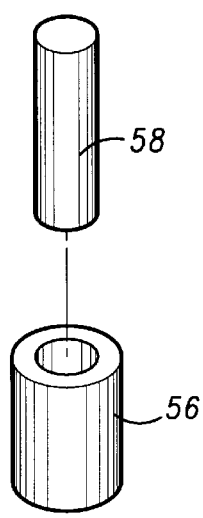

In an alternative embodiment (see FIG. 7) the members 46 are combined with a spacer in a single unitary support structure 54, such as shown in FIGS. 6a and 6b. The support structure 54 includes an enlarged base portion 56 and a neck portion 58 that has a smaller periphery (relative to the periphery of enlarged base portion 56), in a region that will be substantially juxtaposed with the tiles 10 of the array). One illustrative way to make a unitary support structure is to mold, machine or other wise form a unitary structure. Alternatively, two components can be formed separately and joined together, such as a bushing with a rod (for the neck portion) through it (see FIG. 6b). Joining can be done using any suitable technique. The materials may be similar or different.

The thickness of the substrate 42 may be any suitable thickness including but not limited to conventional thicknesses of about 0.8 to about 1.3 cm. In turn, the second plate in such embodiment has a thickness of about 0.5 to about 0.8 cm.

The material choice for the respective components of the devices of the present invention is not critical. However, it is preferred that at least the base substrate 42, the first plate 46 and the second plate 48 employ either substantially the same material or a material that otherwise exhibits substantially the same linear coefficient of thermal expansion relative to one another, in order to avoid distortion upon exposure to temperature changes. By way of illustration, generally the material for such components is a nonconductive material, and more preferably a ceramic. It may also be a silicon material. Preferably the material is an oxide such as alumina (though nitrides, borides, carbides or the like may be used). More preferably, the material is a glass such as (without limitation) a borosilicate glass, a soda lime glass, an alumina silicate glass or the like.

When employed, the first members may be conductive metals, or they may be nonconductive materials such as a ceramic (e.g., glass). The first members can be discretely fabricated and placed on the base substrate. They can also be deposited onto the base substrate (e.g., by electroplating), formed integral with the base substrate, or otherwise machined or formed on the substrate. The second members typically will be a generally nonconductive material that is discretely fabricated and then placed on the base substrate. Of course, other techniques may be employed as well.

It will be appreciated that many different devices can be prepared in accordance with the teachings of the present invention, and the present description is not intended as limiting. In general, the first plate 46 will serve as an active plate, such as an emitter plate, a cathode plate, or the like. The second plate 48, in turn, will be selected to provide a complementary function relative to the first plate. By way of example, when the first plate is a cathode plate, the second plate can be an anode plate. Alternatively, when the first plate is an emitter plate, the second plate can be either an anode plate (such as for phosphor applications) or a transparent cover plate (such as for plasma applications).

By now it should be appreciated that relatively high yield of useful tiles can be obtained in accordance with the present invention, making this invention particularly attractive for the manufacture of arrays and output devices, such as displays. Production runs of tiles can be readily inspected and faulty tiles identified and removed, thereby further enhancing manufacturing efficiencies. Resulting tiles are readily handled and afford high integrity conductive interconnect between tiles along with a relatively seamless appearance to users of resulting devices. Particularly, because electrical connection is possible on two or more sides (e.g., 3, 4 or more) of a tile, resulting tiles also permit for the assembly of arrays larger than 2×2 tiles, such as 3×3 arrays or larger. Large displays, such as those larger than about 100 cm may be prepared in accordance with the present invention.

What is claimed is:

1. A method for making a tile for an array of tiles having a plurality of electrical conductive interconnects between at least two adjacent tiles comprising the steps of:

providing a substrate;

forming a plurality of grooves adapted to contain said electrically conductive interconnects in said substrate according to a first predetermined pattern having at least a first axis;

separating said substrate into a plurality of tiles substantially along said at least one axis.

2. The method of claim 1 further comprising forming a plurality of wells in said substrate according to a second predetermined pattern having at least a second axis.

3. The method according to claim 2 wherein said second axis is generally orthogonal to said first axis.

4. The method according to claim 1 wherein said grooves are formed by mechanical material removal.

5. The method according to claim 1, wherein said substrate is a nonconductive material.

6. The method according to claim 1, wherein the depth of a plurality of said grooves is sufficient to permit molten interconnect to spread and upon solidification be substantially coplanar with the surface of the tile from which said grooves depend.

7. The method according to claim 1, wherein said separating step includes a scribing step.

8. The method according to claim 1, wherein said separating step includes a sawing step.

9. The method according to claim 1, wherein said tiles are dimensioned according to a formula wherein the ratio of the length of a first sides to a second side is about $(4:3)^x$, where x is at least about 1.

10. The method according to claim 9, wherein x is 1.

11. The method according to claim 9, wherein x is 2.

12. The method according to claim 1, wherein said tiles are dimensioned to a substantially square shape.

13. The method according to claim 1, wherein said tiles include both 4:3 and 16:9 dimensioned tiles.

14. A method for forming an electrical connection between tiles of an array, comprising the steps of:
   providing a first tile having a plurality of first grooves along a first edge;
   providing a second tile having a plurality of second grooves along a second edge;
   placing said first tile in spaced opposing relationship adjacent said second tile, and substantially coplanar therewith and so that said first and second grooves are substantially juxtaposed;
   introducing a conductive interconnect in the space defined between said first edge and said second edge and said first and second grooves.

15. The method according to claim 14, wherein members are employed to align said tiles.

16. The method according to claim 14, wherein said conductive interconnect is a metal.

17. The method according to claim 14, wherein said conductive interconnect has the surface characteristics of a solder.

18. The method according to claim 17, wherein said conductive interconnect is solder.

19. A method for making a display device, comprising the steps of:
   providing a base substrate having a first surface;
   placing a first plate in opposing relationship with said first surface;
   placing a second plate in opposing spaced relationship to said first plate; and
   wherein said first plate includes an array of active tiles, said array including a first tile having a plurality of first grooves along a first edge, a second tile having a plurality of second grooves along a second edge, said first tile and said second tile in spaced opposing relationship adjacent one another so that said first and second grooves are substantially juxtaposed, and having a conductive interconnect in the space defined between said first edge and said second edge and said first and second grooves.

20. The method according to claim 19, further comprising placing a first end of a plurality of first support members onto said first surface, and placing said first plate onto a second end of said first support members.

21. The method according to claim 19, further comprising inserting a spacer support member to maintain said opposing spaced relationship between said first and second plates.

22. The method according to claim 21, wherein said spacer members are employed at the intersections of said tiles.

23. The method according to claim 19, further comprising enclosing said base substrate, said first plate and said second plate.

24. The method according to claim 19, wherein said first plate is an active plate.

25. The method according to claim 19, wherein said first plate is a cathode.

26. The method according to claim 25, wherein said second plate is an anode.

27. The method according to claim 19, wherein the first plate is an emitter plate.

28. The method according to claim 27, wherein the second plate is an anode plate.

29. The method according to claim 27, wherein said second plate is a transparent cover plate.

30. The method according to claim 19, wherein said base substrate is a material having a linear coefficient of thermal expansion that is substantially the same as the first plate and said second plate.

31. The method according to claim 19, wherein at least three first support members are employed for each tile.

32. The method according to claim 19, wherein said first plate and said base substrate are spaced to define a plenum.

33. The method according to claim 32, further comprising introducing a getter material into the space defined in said plenum.

34. The method according to claim 33 comprising sealing said display device.

35. The method according to claim 34, further comprising evacuating said display device.

36. The method according to claim 19, wherein a unitary structure is employed to maintain said first plate spaced from said base substrate and to space said first plate from said second plate.

* * * * *